Patented Oct. 25, 1932

1,884,553

UNITED STATES PATENT OFFICE

THEODORE F. BRADLEY, OF WESTFIELD, NEW JERSEY

COMPOSITION INTENDED FOR COATING, DECORATING, AND PRINTING WOOD, METAL, PAPER, CLOTH, AND OTHER SURFACES

No Drawing.   Application filed April 11, 1927.   Serial No. 183,011.

This invention relates to nitrocellulose coating compositions and to the process of making same, and particularly relates to compositions suitable for the manufacture of artificial leather, coated fabrics, printing lacquers and various other products where a particularly low volatility is necessary.

It is the object of my invention to provide nitrocellulose coating compositions which shall be almost non-volatile at ordinary room temperature, that, is, at approximately 70° F., and yet which will dry quickly at slightly elevated temperatures, for example, at about 140° F. This is of particular importance where liquids of alleged toxic nature, such as for example, benzol, are employed, and also when improved flowing and working qualities are desirable. Thus, in the manufacture of artificial leather where benzol is often used in admixture with ethyl acetate to form a solvent vehicle for nitrocellulose, various ills have been attributed to the vapors of benzol. One of the features of the present invention comprises a method for reducing, and, in fact, practically eliminating all evaporation of benzol at ordinary room temperatures from nitrocellulose solutions or dopes, although not preventing the evaporation when the temperature is elevated, such as when the coated materials are passed through ovens, equipped with ventilating devices or solvent recovery systems. It is sufficient to minimize evaporation at room temperatures so that the coated fabrics and solutions which the workmen handle, will not produce poisoning.

Another feature of this invention comprises a method of reducing the volatility of nitrocellulose lacquers, so that they may be utilized in the production of printing compositions in place of ordinary printing and lithographing inks. Nitrocellulose solutions as ordinarily made are relatively and progressively quick-drying, and therefore cannot be used successfully for the purposes indicated.

Attempts have been made to secure easy flowing and slow drying lacquers by utilizing as solvents extremely high boiling solvents of low volatility. Such solvents as glycol diacetate, glycol and glycerine ethers and esters, benzyl acetate, and various other cellulose ester solvents of the same range of volatility having been considered. These vehicles are rather costly and furthermore, have the disadvantage of being somewhat too slow drying, even when the materials are oven dried. Under the present invention I effect less expensive and generally more satisfactory results.

This invention comprises nitrocellulose coating compositions which contain a solvent for nitrocellulose easily volatile at ordinary room temperatures, preferably with a diluent of like volatility, together with such a percentage of a wax as will prevent appreciable evaporation of said solvents and yet yield a surface finish substantially free from rings, pock marks, waxy finish, or other such irregularities commonly caused by excess wax. It has been found that waxes such as Japan and carnauba waxes are of but little value in accomplishing the object of this invention, the most satisfactory results having been secured from either paraffin or ceresin wax. Furthermore, definite proportions have been determined, the use of substantially greater amounts than those stipulated tending to reduce the gloss of the coatings and to produce rings, pock marks, waxy surfaces, and various other surface irregularities, while the use of substantially lesser amounts does not satisfactorily check evaporation at room temperatures.

Thus a lacquer composition suitable for printing may be made as follows:

| | Parts by weight |
|---|---|
| Rosin ester | 40 |
| Dibutyl phthalate | 90 |
| One-half second viscosity nitrocellulose | 75 |
| Zinc oxide | 140 |
| Butyl acetate | 150 |
| Toluol | 150 |
| Ethyl alcohol | 30 |
| Ceresin wax | 2 |

This printing lacquer does not dry readily at ordinary room temperatures and yet has been found to dry very rapidly when surfaces coated with it are placed in an oven at about 120° to 140° F. The composition has been found to dry to a flexible and glossy smooth surface. In manufacturing such a composition the wax and resin are dissolved in a portion of the solvent mixture. The nitrocellulose may be dissolved in a separate portion of the same solvent mixture. The pigment may then be ground in the plasticizing agent, or in a mixture of the wax and resin solution and the plasticizing agent. This may be accomplished by means of an ordinary flat stone or roller paint mill. The presence of the wax is valuable in this operation. In some cases the grinding may be accomplished by means of a ball mill. After the pigment has been ground in the manner indicated the various solutions are admixed to give a composition substantially as indicated.

Various other types of resins may be employed such as are commonly used in nitrocellulose compositions, including all of the usual natural resins, as well as such synthetic resins as benzoic phthalic glyceride resin, rosin phthalic glyceride resin, Congo rosin phthalic glyceride resin, castor oil phthalic glyceride resin, and also a special type of resins produced from cottonseed oil fatty acids, phthalic anhydride and glycerol. In some cases, all resin may be omitted. Various other types of plasticizing agents may be employed, or mixtures thereof, among which are castor and rapeseed oils, dibutyl and diethyl phthalate, tricresyl phosphate, camphor, and other nitrocellulose softening or plasticizing agents. Any of the usual pigments may be likewise employed, according to the general character of the coating desired.

Various solvents may be employed in the production of the new type coating compositions. All of the usual nitrocellulose solvents of a low or medium volatility may be employed, it merely being necessary that said solvents, or mixtures thereof, have sufficient solvent action on the wax to maintain the same substantially in solution; sufficient to function in the manner aforesaid. Thus, either ethyl, propyl, butyl, amyl and hexyl acetates or propionates may be used, in some cases alone or more preferably in admixture with various alcohols or hydrocarbon diluents of like degree of volatility. Other nitrocellulose solvents such as acetone, ethyl methyl ketone and similar volatile solvents may likewise be employed to produce satisfactory solvent vehicles. The proportion of wax may be altered slightly, according to the solvent mixtures employed, although it is in all cases necessary that sufficient wax be used to render satisfactorily slow drying at room temperatures, while avoiding the use of such excessive amounts as will disrupt the surface finish. This will vary slightly according to the solvent mixtures employed and also according to such variations in room temperature as may obtain. In general, it is not advisable to employ substantially over 2 per cent (on the weight of the solvents employed) of paraffin or ceresin wax, much larger amounts having been found to produce defective surface finishes. Nor is it advisable to use much less than ½ of 1 per cent of said waxes. Less wax can be used in cold weather to good advantage in some cases. The use of alcohols have been found of some value in reducing the viscosity of the nitrocellulose solutions, and this is of particular value in the production of printing lacquers. Replacement of 100 parts of toluol with a like amount of butyl alcohol, for example, gives lowered viscosity. The wax content then may be 1½ instead of 2 parts.

The reduction in viscosity due to the addition of a substantial proportion of alcohol is valuable in the production of nitrocellulose printing inks. By such reduction in viscosity adhesion of the type to the paper is considerably reduced. On the other hand, the presence of a high proportion of alcohol tends to throw the wax out of solution and therefore it is best to reduce the content of the wax, keeping in mind that any precipitated wax is likely to affect the gloss or appearance of the surface. Avoidance of wax markings on the surface may be attained by proportioning the solvents with respect to the wax, so that the varnish or lacquer on drying does not expel wax from the coating in such a manner as to yield a disfigured surface. It will be noted in the illustrative formula that I have shown a proportion of 2 parts of wax to 75 parts of nitrocellulose. As a general rule, I aim to have the content of wax very much less in proportion than that of the nitrocellulose. In this manner, furthermore, wax markings are minimized.

The hydrocarbon such as benzol, toluol, solvent naphtha, and the like, serves as a solvent for the wax, although acting as a precipitant for the nitrocellulose. On the other hand, the nitrocellulose solvents, as a rule, are poor solvents for wax. Therefore, to proportion a composition having the requisite solubility for nitrocelullose and for wax and containing a minimum amount of wax consistent with the substantial hindering of evaporation of the wax at room temperature, calls for a consideration of the principles set forth in the present specification.

It has been proposed to employ wax in paint and varnish removing compositions to retard evaporation, but in such compositions the proportion of wax is not confined to very narrow limits. Whereas, in my composition a definite limitation is placed on the wax content to avoid surface defacement. In my composition the wax preferably is maintained almost entirely in solution or dispersion through the aid of the nitrocellulose functioning as a protective colloid. Furthermore, the present application relates to compositions which are intended for coating purposes, that is, to cover over or ornament a surface, or to produce printed impressions, and the like, whereas the aforesaid paint and varnish removers are intended for the removal of coatings. In other words, my composition is intended for a totally different purpose than paint and varnish remover and is, moreover, prepared with respect to considerations of a character totally different from those obtaining in meeting the requirements of paint and varnish removers.

My invention therefore comprises a composition adapted for coating surfaces such as the production of artificial leather, or for printing surfaces of paper, leather, and the like, and for other similar operations where a flexible surfacing is to be applied, such composition comprising nitrocellulose or cellulose acetate or other analogous soluble cellulose material dissolved in a volatile solvent, sometimes unitary, but preferably a composite one, preferably composed of a mixture of nitrocellulose solvents and wax solvents and containing a proportion of wax very slight with respect to the total amount of the composition, but sufficient to substantially prevent evaporation, at say, 70° F., while not materially preventing evaporation at temperatures somewhat above 100° F.

To secure a maximum degree of wax-dispersing effect with a minimum of wax-expulsion with the object of eliminating surface defacement by the wax, I preferably employ low viscosity nitrocellulose such as the one-half second and four second material have a desirable cooperating action with the mineral wax or other wax employed. With such low viscosity nitrocelluloses I may use a more effective concentration of wax and still keep the proportion of wax below a surface-defacing concentration. Employment of low viscosity nitrocellulose in conjunction with a modicum of wax in compositions intended for coating, decorating and printing wood, metal, paper, cloth, and other surfaces, constitutes a feature of the preferred form of my invention.

I have set forth paraffin or ceresin wax in the preferred compositions, and in general, have preference for a mineral wax; ceresin, because of its amorphous character being of particular value from the standpoint of effective dispersion and adequate proportion at a concentration approaching the surface-defacing point. Beeswax and other waxes or mixtures of waxes, e. g., a mixture of beeswax and ceresin wax having properties like, or approximating the mineral waxes as set forth herein are included within the purview of my invention, which embraces substances, a modicum of which greatly reduces evaporation of the unitary or composite volatile solvent vehicle at room temperature while permitting free escape thereof at slightly elevated temperatures. In its more specific aspects the invention is concerned with a printing paint of the character set forth above.

The proportions in the illustrative example may be varied and the components altered in grade or quality as desired within wide limits (except as regards proportion of wax as has been described). Some of the components are not essential at all times, and plasticizer, for example, may be omitted in some cases. The resinous body likewise may be omitted if a pronounced gloss or strong adhesion is not needed. The unpigmented composition may be employed as a transparent or translucent coating.

What I claim is:

1. In compositions intended for coating, decorating and printing wood, metal, paper, cloth and other surfaces, a medium comprising nitrocellulose, a composite volatile solvent vehicle therefor, a resin, a plasticizer, a pigment, and a modicum of wax greatly reducing evaporation of the solvent vehicle at room temperature while permitting free escape thereof at slightly elevated temperatures; said proportion of wax being below a surface-defacing concentration whereby the composition dries to a smooth glossy surface.

2. In compositions intended for coating, decorating and printing wood, metal, paper, cloth and other surfaces, a medium comprising low viscosity nitrocellulose cooperating with a modicum of wax to greatly reduce evaporation of the solvent at room temperature while permitting free escape thereof at slightly elevated temperatures; said proportion of wax being below a surface-defacing concentration.

3. A printing paint comprising nitrocellulose, a solvent, and from ½ to 2 percent of ceresin wax.

4. A printing lacquer comprising nitrocellulose, a solvent containing sufficient alcohol to reduce the viscosity of the solution, and an amount of wax sufficient to reduce evaporation of the solvent but insufficient to cause wax markings on the printed surface.

5. In compositions intended for coating, decorating and printing wood, metal, paper, cloth and other surfaces, a medium comprising nitrocellulose, a volatile solvent, and a modicum of wax greatly reducing evaporation of the solvent at room temperature while permitting free escape thereof at slightly elevated temperatures.

6. In compositions intended for coating, decorating and printing wood, metal, paper, cloth and other surfaces, a medium comprising low viscosity nitrocellulose cooperating with a modicum of wax below a proportion of wax of surface defacing concentration.

7. In the preparation of materials for use in cellulose ester dopes, the step of grinding pigment in a wax solution, and incorporating the product with a cellulose ester.

8. In the preparation of materials for use in cellulose ester dopes, the step of grinding pigment in a solution of wax and resin, and incorporating the product with a cellulose ester.

9. In the preparation of materials for use in nitrocellulose dopes, the step of grinding pigment in a wax solution containing a plasticizing agent for nitrocellulose, and incorporating the product with a cellulose ester.

10. A material for use in cellulose ester dopes, comprising pigment ground in a wax solution containing a plasticizing agent for nitrocellulose.

11. In compositions intended for coating, decorating and printing wood, metal, paper, cloth and other surfaces, a medium comprising low viscosity nitrocellulose in solution in a vehicle including a wax solution and pigment ground in that wax solution.

12. A composition intended for coating, decorating and printing wood, metal, paper, cloth and other surfaces comprising low viscosity nitrocellulose, a solvent vehicle, and a mineral wax, the ratio of nitrocellulose to wax being high enough to prevent surface marking on a deposited coating.

13. A composition intended for coating, decorating and printing wood, metal, paper, cloth and other surfaces comprising nitrocellulose, a solvent vehicle including an aromatic hydrocarbon diluent and alcohol, and a mineral wax, the amount of wax being sufficient to prevent substantial evaporation of the hydrocarbon diluent at temperatures of about 70° F. without producing surface marking.

14. A composition intended for coating, decorating and printing wood, metal, paper, cloth and other surfaces comprising nitrocellulose, a solvent vehicle including benzol and a mineral wax, the amount of wax being sufficient to prevent substantial evaporation of the benzol at temperatures of about 70° F. but insufficient to prevent substantial evaporation of the benzol at temperatures above 100° F.

15. A composition as set forth in claim 14 in which the amount of wax is below that which will produce undesired surface markings in a coating of the material deposited from the solution.

THEODORE F. BRADLEY.